(12) United States Patent
Li et al.

(10) Patent No.: US 7,965,785 B2
(45) Date of Patent: Jun. 21, 2011

(54) UPLINK MULTIPLE-INPUT-MULTIPLE-OUTPUT (MIMO) AND COOPERATIVE MIMO TRANSMISSIONS

(75) Inventors: Anxin Li, Beijing (CN); Xiangming Li, Beijing (CN); Hidetoshi Kayama, Beijing (CN); Ismail Guvenc, Santa Clara, CA (US); Moo Ryong Jeong, Saratoga, CA (US)

(73) Assignee: NTT DOCOMO, Inc., Tokyo (JP)

( * ) Notice: Subject to any disclaimer, the term of this patent is extended or adjusted under 35 U.S.C. 154(b) by 902 days.

(21) Appl. No.: 11/930,600

(22) Filed: Oct. 31, 2007

(65) Prior Publication Data
US 2008/0247488 A1 Oct. 9, 2008

Related U.S. Application Data

(60) Provisional application No. 60/910,151, filed on Apr. 4, 2007.

(51) Int. Cl.
*H04B 7/02* (2006.01)
(52) U.S. Cl. ........................................ 375/267
(58) Field of Classification Search .................. 375/260, 375/267
See application file for complete search history.

(56) References Cited

U.S. PATENT DOCUMENTS

| | | | |
|---|---|---|---|
| 2005/0249304 A1 | 11/2005 | Takano et al. | |
| 2005/0286408 A1* | 12/2005 | Jin et al. | 370/208 |
| 2006/0056540 A1 | 3/2006 | Magee | |
| 2006/0120477 A1 | 6/2006 | Shen et al. | |
| 2007/0036071 A1 | 2/2007 | Herdin | |
| 2007/0064641 A1 | 3/2007 | Laroia et al. | |
| 2007/0189151 A1* | 8/2007 | Pan et al. | 370/210 |
| 2008/0025422 A1* | 1/2008 | Bitran et al. | 375/260 |

OTHER PUBLICATIONS

PCT International Search Report for International Application No. PCT/US2008/059307 dated Dec. 23, 2009, 2 pages.
PCT Written Opinion of the International Application No. PCT/US2008/059307 dated Dec. 23, 2009, 3 pages.
IEEE Std 802.16e-2005 and IEEE Std 802.16-2004/Cor1-2005; "Part 16: Air Interface for Fixed and Mobile Broadband Wireless Access Systems—Amendment 2: Physical and Medium Access Control Layers for Combined Fixed and Mobile Operation in Licensed Bands and Corregendum 1"; Copyright Feb. 28, 2006; pp. 1-822.
IEEE Std 802.16-2004; "Part 16: Air Interface for Fixed Broadband Wireless Access Systems"; Copyright Oct. 1, 2004; pp. 1-857.
Gesbert, David; Shafi, Mansoor; Shiu, Da-shan; Smith, Peter J.; Naguib, Ayman; "From Theory to Practice: An Overview of MIMO Space-Time Coded Wireless Systems"; IEEE Journal On Selected areas in Communications, vol. 21, No. 3; Copyright Apr. 2003; pp. 281-302.

(Continued)

*Primary Examiner* — David B Lugo
(74) *Attorney, Agent, or Firm* — Haynes & Boone, LLP.

(57) ABSTRACT

A method is provided for MIMO uplink communications between a base station and a wireless station with more than two antennae. The method includes: (a) negotiating between the base station and the wireless station uplink MIMO/cooperative MIMO capabilities, using a message exchange protocol in which a message exchanged comprises a field for specifying uplink MIMO/cooperative MIMO capabilities; (b) the base station receiving a request from the wireless station for data transmission; (c) the base station sending the wireless station an allocated resource and an uplink MIMO/cooperative MIMO method for uplink transmission; (e) the wireless station mapping data symbols to the allocated resource with proper pilot pattern; and (f) the base station detecting the data symbols from the channel.

21 Claims, 14 Drawing Sheets

Uplink transmission procedure in one embodiment of the present invention

OTHER PUBLICATIONS

An Approval Letter to Paul Nikolich from Jodi Haasz dated Mar. 31, 2006 regarding P802.16j; Amendment to IEEE Standard for Local and Metropolitan Area Networks—"Part 16: Air Interface for Fixed and Mobile Broadband Wireless Access Systems—Multihop Relay Specification"; http://standards.ieee.org/board/nes/projects/802-16j.pdf; Approved Mar. 30, 2006; pp. 4.

An approval Letter to Paul Nikolich from Sherry Hampton dated Dec. 6, 2006 regarding P802.16; IEEE Standard for Local and Metropolitan Area networks—"Part 16: Air Interface for Fixed Broadband Wireless Access Systems"—Amendment: IEEE Standard for Local and Metropolitan Area Networks—"Part 16: Air Interfaxe for Fixed and Mobile Broadband Wireless Access Systems—Advancec Air Interface"; http://standards.ieee.org/board/nes/projects/802-16m.pdf; Appoved Dec. 6, 2006; pp. 4.

Andrew Baek et al.; "Harmonized Contribution on 802.16j (Mobile Multihop Relay) Usage Models"; IEE 802.16j-06/015 Sep. 5, 2006; pp. 15.

* cited by examiner

| Type | Length | Value | Scope |
|------|--------|-------|-------|
| 157 | 1 | Bit#0: 2-antenna STTD<br><br>Bit#1: 2-antenna SM with vertical coding<br><br>Bit#2: single-antenna cooperative SM<br><br>Bit#3-7: Reserved | SBC-REQ<br><br>SBC-RSP |

Fig. 2 Fields of the SBC-REQ and SBC-RSP messages

| Syntax | Size | Notes |
|---|---|---|
| MIMO_UL_Enhanced_IE() { | | |
| Extended-2 UIUC | 4bits | MIMO_UL_Enhanced_IE= 0x06 |
| Length | 8bits | Length in bytes |
| Num_Assign | 4bits | Number of burst assignment |
| For (j=0;j<Num_assign;j++) { | — | — |
| Num_CID | 2bits | — |
| For (i=0; i<Num_CID; i++) { | | |
| CID | 16bits | MS basic CID |
| UIUC | 4bits | |
| Matrix_Indicator | 1bits | For MS with single antenna, skip this field; For MS with dual antennas 0: Matrix A (STTD, see 8.4.8.4.3 [2]) 1: Matrix B (SM, see 8.4.8.4.3 [2]) |
| Pilot Pattern Indicator | 1bits | For MS with single antenna 0: pilot pattern A 1: pilot pattern B For MS with dual antenna (For PUSC only) 0: pilot pattern A/B 1: pilot pattern C/D |
| Reserved | 2bits | Shall be set to zero. |
| } | | |
| Duration | | |
| } | | |
| Padding | | |
| } | | |

Figure 3  MIMO_UL_Enhanced_IE in IEEE 802.16e

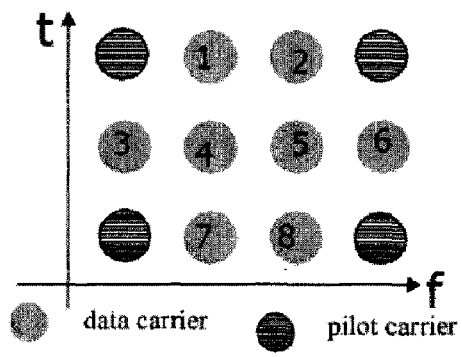
Figure 4 The structure of a tile
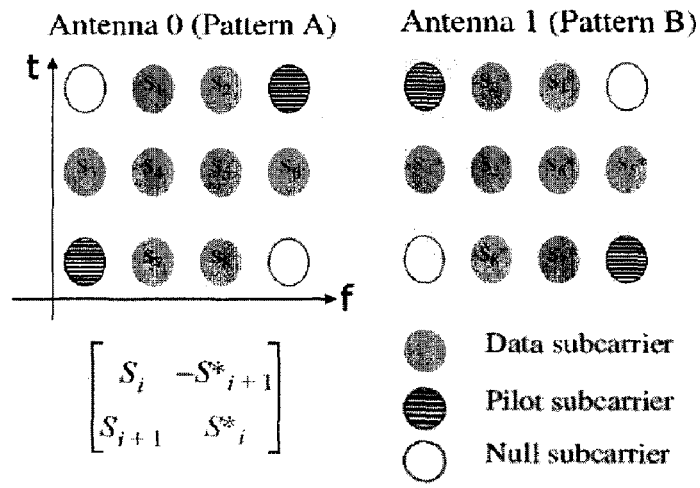
Figure 5 Mapping of data symbols and pilot symbols to the tile
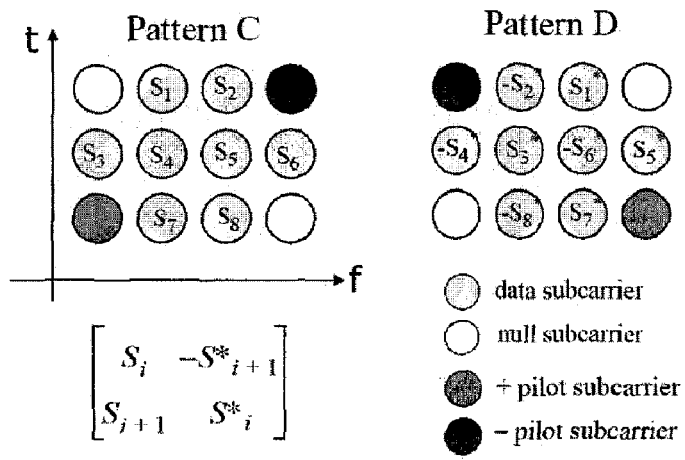
Figure 6 Mapping of data symbols and pilot symbols to the tile

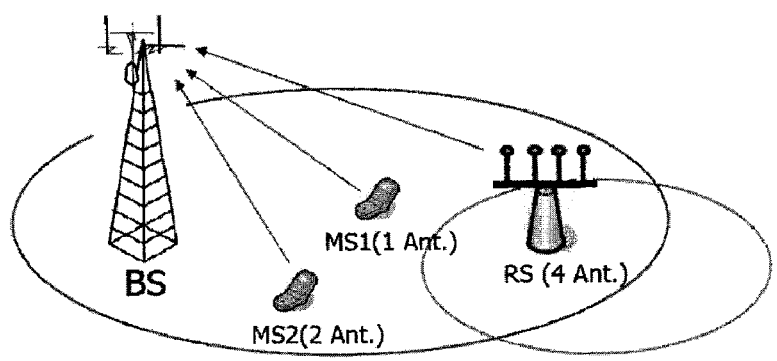
Fig. 7 Uplink transmission in IEEE 802.16j network
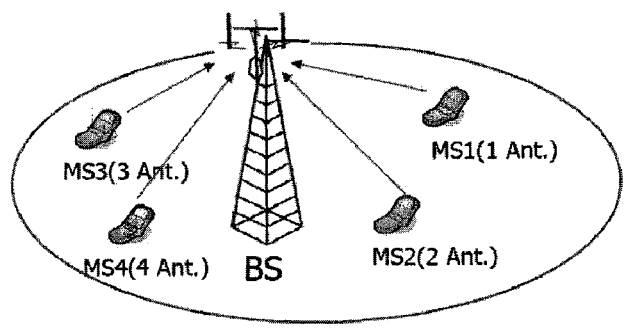
Fig. 8 Uplink transmission in IEEE 802.16m network or another mobile network Uplink transmission procedure in one embodiment of the present invention

| Type | Length | Value | Scope |
|---|---|---|---|
| Type_Number | 2 | Bit #0: 3-antenna STFC matrix A<br>Bit #1: 3-antenna STFC matrix B, vertical coding<br>Bit #2: 3-antenna STFC matrix C, vertical coding<br>Bit #3: 3-antenna STFC matrix C, horizontal coding<br>Bit #4: 4-antenna STFC matrix A<br>Bit #5: 4-antenna STFC matrix B, vertical coding<br>Bit #6: 4-antenna STFC matrix B, horizontal coding<br>Bit #7: 4-antenna STFC matrix C, vertical coding<br>Bit #8: 4-antenna STFC matrix C, horizontal coding<br>Bit #9: Capable of antenna selection<br>Bit #10: Capable of antenna grouping<br>Bit #11: Capable of codebook based precoding<br>Bit #12: Capable of long-term precoding<br>Bit #13: Cooperative SM<br>Bit #14: *Reserved*<br>Bit #15: *Reserved* | SBC-REQ<br>SBC-RSP |

Fig. 10 TLV field in a SBC-REQ or SBC-RSP message for a WS with three or four antennae

| Syntax | Size | Notes |
|---|---|---|
| MIMO_UL_Enhanced_IE() { | | |
| Extended-2 UIUC | 4bits | MIMO_UL_Enhanced_IE= 0x06 |
| Length | 8bits | Length in bytes |
| Num_Assign | 4bits | Number of burst assignment |
| For (j=0;j<Num_assign;j++) { | — | — |
| Num_CID | 2bits | — |
| For (i=0; i<Num_CID; i++) { | | |
| CID | 16bits | MS/RS basic CID |
| UIUC | 4bits | |
| Matrix_Indicator | 1bits ($b_1$) | For MS with single antenna, skip this field; For MS with dual antennas<br>0: Matrix A (STTD, see 8.4.8.4.3 [2])<br>1: Matrix B (SM, see 8.4.8.4.3 [2]) |
| Pilot Pattern Indicator | 1bits ($b_2$) | For MS with single antenna<br>0: pilot pattern A<br>1: pilot pattern B<br>For MS with dual antenna (For PUSC only)<br>0: pilot pattern A/B<br>1: pilot pattern C/D |
| ~~Reserved~~ Matrix_Indicator_RS | 2bits ($b_3 b_4$) | For MS with 3 antennas<br>Switch (b1b2b3b4)<br>{Ref. to Fig.12}<br>For MS with 4 antennas<br>Switch (b1b2b3b4)<br>{Ref. to Fig.13} |
| } | | |
| Duration | | |
| } | | |
| Padding | | |
| } | | |

Figure 11 MIMO_UL_Enhanced_IE which supports a WS with three or four antennae.

| $b_1b_2b_3b_4$ | Uplink MIMO Coding Matrices Mapping Table |
|---|---|
| 0b0000 | $A_1$ |
| 0b0001 | $A_2$ |
| 0b0010 | $A_3$ |
| 0b0011 | $B_1$ |
| 0b0100 | $B_2$ |
| 0b0101 | $B_3$ |
| 0b0110 | C |
| 0b0111 | $C_1$-one stream |
| 0b1000 | $C_2$-one stream |
| 0b1001 | $C_3$-one stream |
| 0b1010 | $C_1$-two streams |
| 0b1011 | $C_2$-two streams |
| 0b1100 | $C_3$-two streams |
| 0b1101 | *Reserved* |
| 0b1110 | *Reserved* |
| 0b1111 | *Reserved* |

Fig. 12 MIMO coding matrices mapping table for a WS with three antennae

| $b_1b_2b_3b_4$ | Uplink MIMO Coding Matrices Mapping Table |
|---|---|
| 0b0000 | $A_1$ |
| 0b0001 | $A_2$ |
| 0b0010 | $A_3$ |
| 0b0011 | $B_1$ |
| 0b0100 | $B_2$ |
| 0b0101 | $B_3$ |
| 0b0110 | $B_4$ |
| 0b0111 | $B_5$ |
| 0b1000 | $B_6$ |
| 0b1001 | C |
| 0b1010 | *Reserved* |
| 0b1011 | *Reserved* |
| 0b1100 | *Reserved* |
| 0b1101 | *Reserved* |
| 0b1110 | *Reserved* |
| 0b1111 | *Reserved* |

Figure 13 MIMO coding matrices mapping table for wireless station with four antennae.

| Syntax | Size | Notes |
| --- | --- | --- |
| MIMO_UL_Extended_IE() { | | |
| Extended UIUC | 4bits | MIMO_UL_Extended_IE()= 0x0B |
| Length | 8bits | variable |
| Num_Assign | 4bits | Number of burst assignment |
| For (j=0;j<Num_assign;j++) { | | |
| Num_CID | 2bits | |
| For (i=0; i<Num_CID; i++) { | | |
| CID | 16bits | RS basic CID |
| UIUC | 4bits | |
| Antenna_Indicator | 4bits | Indicates the antennas used for transmission<br>0: antenna is not used<br>1: antenna is used |
| If (single antenna is used) { | | |
| Pilot Pattern Indicator | 2bits | Indicates pilot pattern<br>0b00: pilot pattern A<br>0b01: pilot pattern B<br>0b10: pilot pattern C<br>0b11: pilot pattern D |
| }elseif ( dual antennas are used){ | | |
| Matrix_Indicator | 2bits | Indicates transmission matrix<br>0b00= Matrix A<br>0b01= Matrix B<br>0b10= Matrix C<br>0b11= Codebook |
| Pilot Pattern Indicator | 1bits | 0: pilot pattern A/B<br>1: pilot pattern C/D |
| If (Matrix_Indicator== 0b11) { | | |
| Num stream | 1bits | Indicates number of streams<br>0: 1 stream;<br>1: 2 steam |
| Codebook Precoding Index | 3bits | Indicates the index of the precoding matrix in the codebook |
| } | | |
| }elseif ( three antennas are used){ | | |
| Matrix_Indicator | 2bits | Indicates transmission matrix<br>0b00= Matrix A<br>0b01= Matrix B |

Figure 14-1

| | | 0b10= Matrix C |
| | | 0b11= Codebook |
| If (Matrix_Indicator==0b00 or 0b01) { | | |
| Antenna_Grouping_Indicator | 2bits | Indicating the index of the antenna grouping index |
| | | if (Matrix_indicator== 0b00) |
| | | 0b000~0b010=0b101110~0b110000 in table 298g [2] |
| | | else |
| | | 0b000~0b010=0b110001~0b110011 in table 298g[2] |
| } | | |
| If(Matrix_Indicator== 0b11) { | | |
| Num stream | 2bits | Indicates number of streams |
| Codebook Precoding Index | 6bits | Indicates the index of the precoding matrix in the codebook |
| } | | |
| }else{ | | |
| Matrix_Indicator | 2bits | Indicates transmission matrix |
| | | 0b00= Matrix A |
| | | 0b01= Matrix B |
| | | 0b10= Matrix C |
| | | 0b11= Codebook |
| If (Matrix_Indicator== 0b00 or 0b01) { | | |
| Antenna Grouping Index | 3bits | Indicating the index of the antenna grouping index |
| | | if (Matrix_indicator== 0b00) |
| | | 0b000~0b010=0b101110~0b110000 in table 298g [2] |
| | | else |
| | | 0b000~0b101=0b110001~0b110110 in table 298g [2] |
| } | | |
| If (Matrix_Indicator== 0b11) { | | |
| Num stream | 2bits | Indicates number of streams |
| Codebook Precoding Index | 3bits | Indicates the index of the precoding matrix in the codebook |
| } | | |
| } | | |
| } | | |
| Duration | 10bits | In OFDMA slots |
| } | | |
| *Padding* | | |
| } | | |

Fig. 14-2  uplink MIMO IE for a WS with 3 or 4 antennae $$C_2 = c \begin{bmatrix} s_1 \\ s_2 \\ 0 \\ s_3 \end{bmatrix} \implies C = \begin{bmatrix} S_1 \\ S_2 \\ S_3 \end{bmatrix}$$

4 ant.       3 ant.
Antenna selection    Spatial multiplexing

Fig. 15 Example of overhead reduction.

| UL MIMO Modes | 2 Ant. RS | 3 Ant. RS | 4 Ant. RS |
|---|---|---|---|
| Spatial Multiplexing | Matrix B and C | Matrix C with antenna selection | Matrix C with antenna selection |
| Space-time-frequency Coding | Matrix A | Matrix A1, A2 and A3<br><br>Matrix B1, B2 and B3 | Matrix A1, A2 and A3<br><br>Matrix B1, B2, B3, B4, B5 and B6 |
| Precoding scheme | V(2,1,3),V(2,2,3) | V(3,1,3),V(3,1,6) | V(4,1,3),V(4,3,3),V(4,4,3) |
| Cooperative MIMO | $C(1,1), C(1,2), C(2,1), C(2,2), C(1,3), C(3,1), C(1,1,1), C(1,1,2), C(1,2,1), C(2,1,1), C(1,1,1,1)$ | | |

Fig. 16 Supported MIMO/Cooperative MIMO methods in MIMO_UL_Extended_IE.

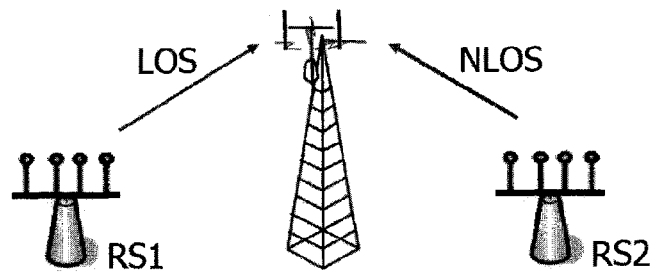
Figure 17 cooperative MIMO method supported by MIMO_UL_Extended_IE.
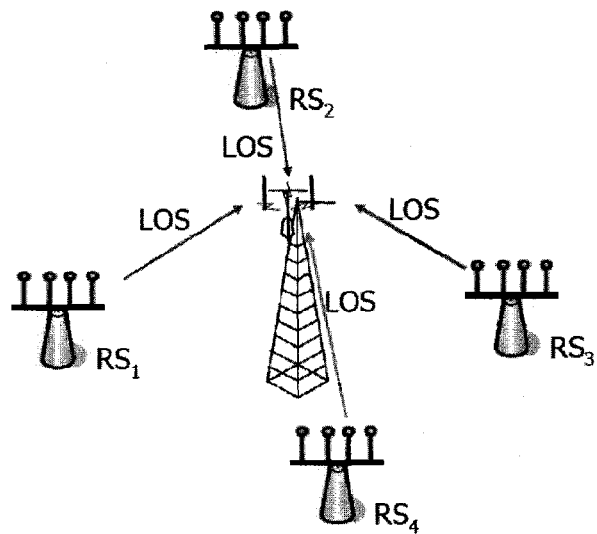
Figure 18 Cooperative MIMO transmission with four wireless stations.

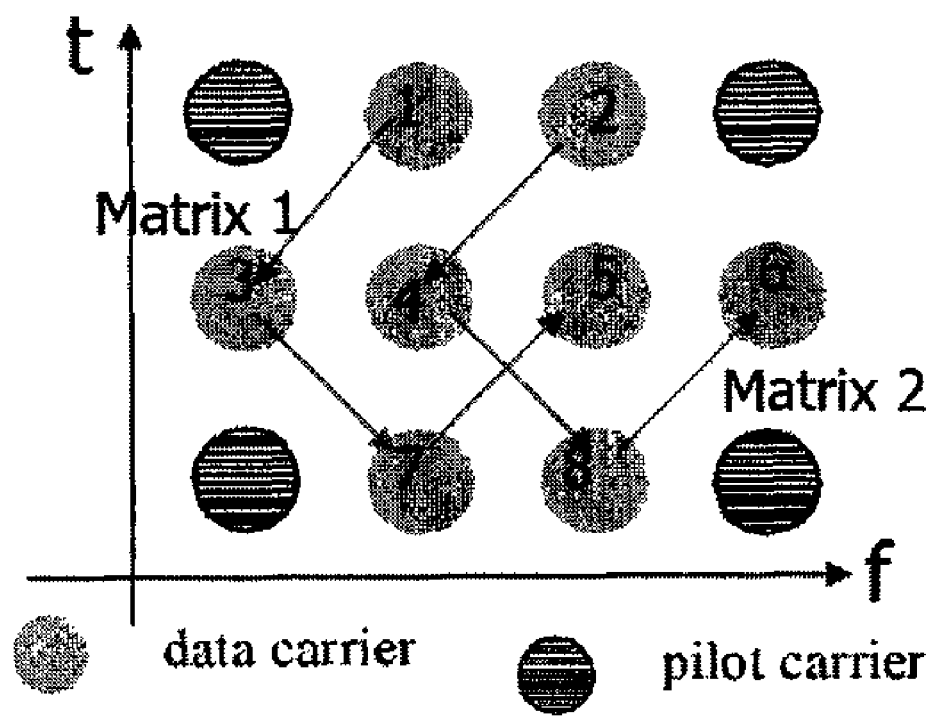
Figure 19 Data mapping rule.

UPLINK MULTIPLE-INPUT-MULTIPLE-OUTPUT (MIMO) AND COOPERATIVE MIMO TRANSMISSIONS

CROSS REFERENCE TO RELATED APPLICATIONS

The present application claims priority of U.S. provisional patent application No. 60/910,151, filed Apr. 4, 2007, incorporated herein by reference.

BACKGROUND OF THE INVENTION

1. Field of the Invention

The present invention relates generally to IEEE 802.16 wireless metropolitan networks (WMAN) and the wireless stations (e.g., subscriber station (SS), mobile station (MS), or relay station (RS)) of such a network. More particularly, the present invention relates to uplink multiple-input-multiple-output (MIMO) transmissions or cooperative MIMO transmissions for wireless stations each with more than two transmission antennae.

2. Discussion of the Related Art

MIMO and cooperative MIMO techniques enhance system performance in a wireless communication system (e.g., a cellular network or an IEEE 802.16 network) by exploiting spatial domain freedom and signal processing techniques. MIMO and Cooperative MIMO techniques are described, for example, in the article "From theory to practice: an overview of MIMO space-time coded wireless systems," by D. Gesbert, M. Shafi, and D. S. Shiu, *IEEE J. Select. Areas Commun.*, vol. 21, no. 3, pp. 281-302, April 2003.

Certain wireless network standards (e.g., IEEE 802.16-2004[1] and IEEE 802.16e[2]) have adopted MIMO and cooperative MIMO techniques to enhance system performance. Other emerging wireless network standards (e.g., IEEE 802.16j[3] and IEEE 802.16m[4]) are also considering including MIMO and cooperative MIMO techniques to improve system performance (e.g., high data rate or low BER (bit-error-rate)).

[1] IEEE Standard for Local and Metropolitan area networks, Part 16: Air Interference for Fixed Broadband Wireless Access Systems. (October 2004)
[2] IEEE Standard for Local and metropolitan area networks Part 16: Air Interface for Fixed and Mobile Broadband Wireless Access Systems Amendment 2: Physical and Medium Access Control Layers for Combined Fixed and Mobile Operation in Licensed Bands and Corrigendum 1. (February 2006)
[3] P802.16j PAR, P802.16j-Amendment to IEEE Standard for Local and Metropolitan Area Networks—Part 16: Air Interface for Fixed and Mobile Broadband Wireless Access Systems—Multihop Relay Specification. (March 2006; see, e. http://standards.ieee.org/board/nes/projects/802-16j.pdf)
[4] P802.16m P802.16—IEEE Standard for Local and metropolitan area networks—Part 16: Air Interface for Fixed Broadband Wireless Access Systems—Amendment: IEEE Standard for Local and metropolitan area networks—Part 16: Air Interface for Fixed and Mobile Broadband Wireless Access Systems—Advanced Air Interface (see, e.g., http://standards.ieee.org/board/nes/projects/802-16m.pdf) (December 2006)

MIMO techniques are classified into many types, including 1) Spatial multiplexing; 2) Space-time-frequency coding (STFC); 3) Precoding; and 4) Others (e.g., antenna selection and antenna grouping). In a MIMO transmission scheme, a MIMO coding matrix is defined which specifies the signals to be transmitted by different antennae at different times and frequency resource. The Cooperative MIMO technique is a variation of the MIMO techniques. In a cooperative MIMO technique, multiple wireless stations act as different antennae of a conventional MIMO transmitter to form an antenna array which transmits data simultaneously to a BS. The cooperative MIMO technique provides higher uplink spectrum efficiency.

The effectiveness of a MIMO technique is related to the number of transmission antennae. For example, in STFC under a given standard, the MIMO coding matrices are defined for different number of transmission antennae, so that a wireless station having only two transmission antennae cannot use STFC matrices defined for a wireless station with three or four antennae under that standard. Under different standards, the number of allowed antennae is different. For example, under the IEEE 802.16-2004 and the IEEE 802.16e standards, the number of supported transmission antennae of a wireless station is one or two. FIG. 1 shows an exemplary uplink transmission under the IEEE 802.16-2004 standard or the IEEE 802.16e network standard. Under the IEEE 802.16-2004 and IEEE 802.16e standards, uplink transmission is carried out using the following steps:

(a) a wireless station (WS) negotiates with a base station (BS) regarding the uplink MIMO/cooperative MIMO capabilities that may be used in its transmissions;

(b) the WS sends a request to the BS for uplink transmission when the WS has data to be transmitted;

(c) the BS determines the uplink MIMO/cooperative MIMO method (e.g., stream number, STFC matrix, antenna grouping method, and precoding matrix) to be used by the WS, according to the BS's measurement of its channel, the bandwidth requests of the wireless stations, and other parameters;

(d) through an "Information Element" (IE), the BS informs the WS of the resource allocated to the uplink transmission and the MIMO/cooperative MIMO method for the uplink transmission to be used by the WS;

(e) the WS maps data symbols and pilot symbols to the allocated resource, according to pre-defined data mapping rules and pilot patterns indicated in the IE, and performs the MIMO/cooperative MIMO transmissions using the allocated resource; and (f) the BS performs channel estimation and signal detection to detect the received data.

In general, negotiation for the uplink MIMO/cooperative MIMO can be performed when the WS enters the network. The MIMO/cooperative MIMO capabilities refer to such capabilities as supported STFC matrices, antenna selection ability, antenna grouping ability, precoding ability, vertical coding ability, or horizontal coding ability. Under the IEEE 802.16-2004 and the IEEE 802.16e standards, subscriber station basic capability request ("SBC-REQ") and subscriber station basic capability response ("SBC-RSP") messages are used by a WS and a BS to negotiate the uplink MIMO/cooperative MIMO capabilities.

FIG. 2 shows the conventional type length value (TLV) field of SBC-REQ and SBC-RSP messages under the IEEE 802.16-2004 and IEEE 802.16e standards. FIG. 2 shows that the supported uplink MIMO/cooperative MIMO capabilities are: 1) space time transmit diversity (STTD) using two antennae, 2) spatial multiplexing (SM) with vertical coding using two antennae, and 3) single antenna cooperative SM. Therefore, the SBC-REQ and SBC-RSP messages under IEEE 802.16-2004 and IEEE 802.16e standards do not support a WS having more than two antennae.

Examples of IEs used between a BS and a WS under the IEEE 802.16-2004 and IEEE 802.16e standards for communicating the resource allocation and uplink MIMO/cooperative MIMO method include MIMO uplink basic IE ("MIMO_UL_Basic_IE") and MIMO uplink enhanced IE ("MIMO_UL_Enhanced_IE"). Since MIMO_UL_Enhanced_IE encompasses more functions than MIMO_UL_Basic_IE, the following detailed description uses MIMO_UL_Enhanced_IE to illustrate the present invention. FIG. 3 shows the format for a MIMO_UL_Enhanced_IE. As shown in FIG. 3, the Matrix_Indicator (MI) field specifies the MIMO method to be used for uplink transmission. For a WS station with dual antennae, the MI field specifies an STTD matrix. For a WS with a single antenna, the MI field is ignored. The Pilot Pattern Indicator (PI) field specifies a pilot pattern to be used by a WS in an uplink transmission. Thus, as is apparent from FIG. 3, the MIMO_UL_Enhanced_IE supports only MIMO/cooperative MIMO methods for WS's with two or less antennae. New methods should be developed for resource allocation and MIMO/cooperative MIMO methods that support a WS with more than two antennae.

In step (e) discussed above, a WS uses the MIMO coding matrix specified in the IE to perform MIMO encoding, and to map the coded data symbols to the allocated resource with a proper pilot pattern. The uplink basic resource unit is named a "tile," one example of which is shown in FIG. 4. As shown in FIG. 4, a tile includes 12 subcarriers, four of which encode pilot symbols (i.e., the other eight subcarriers used for encoding data symbols). The tile is over three OFDMA symbols in the time domain and over four subcarries in the frequency domain. For uplink transmissions, a WS maps the coded data symbols to the tile. FIGS. 5 and 6 show the data mapping rules for 2-antenna STTD under the IEEE 802.16-2004 standard and the IEEE 802.16e standard, respectively. As shown in FIGS. 5 and 6, the frequency axis has a higher priority than time axis, (i.e. the coded data symbol first maps to the subcarriers within the tile and then to different OFDM symbols within the tile).

The pilot patterns used by a WS in the IEEE 802.16-2004 standard and the IEEE 802.16e standard are determined according to:

(I) For a WS with one antenna, either pilot pattern A or pilot pattern B of FIG. 5 is adopted; the BS determines the pilot pattern to be used by the WS; and (II) For a WS with two antennae, either: (i) antenna 1 uses pilot pattern A and antenna 2 uses pilot pattern B (pilot patterns A and B are shown in FIG. 5); or, (ii) antenna 1 uses pilot pattern C and antenna 2 uses pilot pattern D (pilot patterns C and D are shown in FIG. 6); the BS determines the pilot patterns to be used by the WS.

Therefore, the data mapping rules and pilot mapping rules under the IEEE 802.16-2004 and the IEEE 802.16e standards support data and pilot mapping rules for MIMO/cooperative MIMO methods for one or two antennae. No data mapping and pilot mapping rules are provided to support a WS with more than two antennae.

In step (e) above, the BS performs channel estimation and proper signal detection according the uplink MIMO/cooperative MIMO method to detect the signals of WS's in the allocated resource.

As is apparent from the above detailed descriptions of the uplink MIMO/cooperative MIMO transmission procedures in the IEEE 802.16-2004 and the IEEE 802.16e standards, the IEEE 802.16-2004 and IEEE 802.16e standards cannot support uplink MIMO/cooperative MIMO transmissions for a WS with more than two antennae. However, with the rapid development of the MIMO techniques, WS's with three or four antennae have become common place. For example, a relay station (RS) in an IEEE 802.16j network typically has three or four antennae (see, e.g., IEEE 802.16j-06/015, "Harmonized Contribution on 802.16j (Mobile Multihop Relay) Usage Models"). Under the IEEE 802.16m standard, a mobile station (MS) may also have three or four antennae. Thus, on one hand, current IEEE 802.16-2004 and IEEE 802.16e standards do not support WS's with three or four antennae, and no implementation is known for uplink MIMO/cooperative MIMO transmissions for a WS with three or four antennae. On the other hand, such an implementation is required by the IEEE 802.16j and IEEE 802.16m standards, for example.

Thus, the following methods are needed to implement uplink MIMO/cooperative MIMO transmissions for a wireless station with three or four antennas.

(a) methods for a WS with three or four antennae to negotiate MIMO/cooperative MIMO capabilities with a BS;

(b) concrete MIMO/cooperative MIMO methods for uplink transmissions of a WS with three or four antennae;

(c) methods for informing a WS of the uplink MIMO/cooperative MIMO methods to be used and the allocated resource; and (d) a pilot pattern to be used by a WS with different transmission antenna, and data mapping rules to map data symbols after MIMO encoding to the tile.

SUMMARY

According to one embodiment of the present invention, a method is provided for MIMO uplink communications between a base station and a wireless station. The method includes: (a) negotiating between the base station and the wireless station uplink MIMO/cooperative MIMO capabilities, using a message exchange protocol in which a message exchanged comprises a field for specifying uplink MIMO/cooperative MIMO capabilities; (b) the base station receiving a request from the wireless station for data transmission; (c) the base station sending the wireless station an allocated resource and an uplink MIMO/cooperative MIMO method for uplink transmission; (e) the wireless station mapping data symbols to the allocated resource with proper pilot pattern; and (f) the base station detecting the data symbols from the channel.

According to one embodiment of the present invention, the capabilities include spatial multiplexing, space-time-frequency coding, precoding, transmit antenna selection and transmit antenna grouping, vertical coding and horizontal coding. In addition, uplink precoding vectors and matrices may be provided for wireless stations with two or more antennas.

According to one embodiment, the uplink MIMO/cooperative MIMO method includes STFC matrices, SM matrices, and precoding vectors or matrices. The allocated resource and the uplink MIMO/cooperative MIMO method may be specified in the reserved bits in MIMO_UL_Enhanced_IE under an IEEE wireless network standard, modified to support wireless stations with more than two antennae. Alternatively, the allocated resource and the uplink MIMO/cooperative MIMO method may be specified in a new information element that support wireless stations with more than two antennae.

In one embodiment, the uplink MIMO/cooperative MIMO method may include precoding, antenna grouping and antenna selection matrices.

According to one embodiment of the present invention, more than one MIMO coding matrix may map data symbols to a tile. In one implementation, the subcarriers of symbols in the tile are divided into two non-overlapping groups, and the MIMO coding matrices are each associated with a different one of the two non-overlapping groups.

The present invention is better understood upon consideration of the detailed description below and the accompanying drawings.

BRIEF DESCRIPTION OF THE DRAWINGS

FIG. 2 shows the type length value (TLV) field of SBC-REQ and SBC-RSP messages under the IEEE 802.16e standard.

FIG. 3 shows the format of a MIMO_UL_Enhanced_IE.

FIG. 4 shows one example of the uplink basic resource unit "tile."

FIG. 5 shows the data mapping rules for 2-antenna STTD under the IEEE 802.16-2004 standard.

FIG. 6 shows the data mapping rules for 2-antenna STTD under the IEEE 802.16e standard.

FIG. 7 shows an exemplary uplink transmission in an IEEE 802.16j network having a wireless station (e.g., a relay station) with three or four antennae, in accordance with one embodiment of the present invention.

FIG. 8 shows an exemplary uplink transmission in an IEEE 802.16m network (or another wireless network), in which wireless stations with 1-4 antennae are supported, in accordance with one embodiment of the present invention.

FIG. 10 shows a TLV field defined for SBC-REQ and SBC-RSP messages; the TLV field specifies the MIMO/cooperative MIMO capabilities for a WS having three or four antennae, in accordance with one embodiment of the present invention.

FIG. 11 shows one implementation of a modified MIMO_UL_Enhanced_IE, according to one embodiment of the present invention.

FIG. 12 shows an exemplary MIMO coding matrix mapping table for a WS with three antennae.

FIG. 13 shows an exemplary MIMO coding matrix mapping table for a WS with four antennae.

FIG. 14 shows one exemplary MIMO uplink IE, according to one embodiment of the present invention.

FIG. 15 illustrates overhead reduction achieved by merging the MIMO coding matrix of antenna selection for a 4-antenna WS, with the MIMO coding matrix of spatial multiplexing of a 3-antenna WS.

FIG. 16 summarizes the supported uplink MIMO/cooperative MIMO methods in the MIMO_UL_Extended_IE of FIG. 14.

FIG. 17 shows a cooperative MIMO transmission example that may be supported by the MIMO_UL_Extended_IE in an IEEE 802.16j network.

FIG. 18 shows a cooperative MIMO transmission example, according to one embodiment of the present invention.

FIG. 19 shows one exemplary data mapping rule governing two MIMO coding matrices, in accordance with one embodiment of the present invention.

DESCRIPTION OF PREFERRED EMBODIMENTS

The present invention provides, in a wireless network, support for WS's with more than two antennae. FIG. 7 shows an exemplary uplink transmission in an IEEE 802.16j network having a WS (e.g., a relay station) with three or four antennae, in accordance with one embodiment of the present invention. Similarly, FIG. 8 shows an exemplary uplink transmission in an IEEE 802.16m network (or another wireless network), in which wireless stations with 1-4 antennae are supported, in accordance with one embodiment of the present invention. To support an uplink MIMO/cooperative MIMO transmission by a WS with more than two antennae, the present invention provides new functions, such as:

(a) methods for wireless station with three or four antennae to negotiate its MIMO/cooperative MIMO capabilities with a BS;
(b) concrete MIMO/cooperative MIMO methods for uplink transmissions by a wireless station with three or four antennae;
(c) methods for informing a WS of the uplink MIMO/cooperative MIMO methods to be used and the allocated resource;
(d) pilot patterns to be used by WS's with different transmission antennae; and
(e) data mapping rules to map data symbols, after MIMO encoding to the tile.

Figure 1:
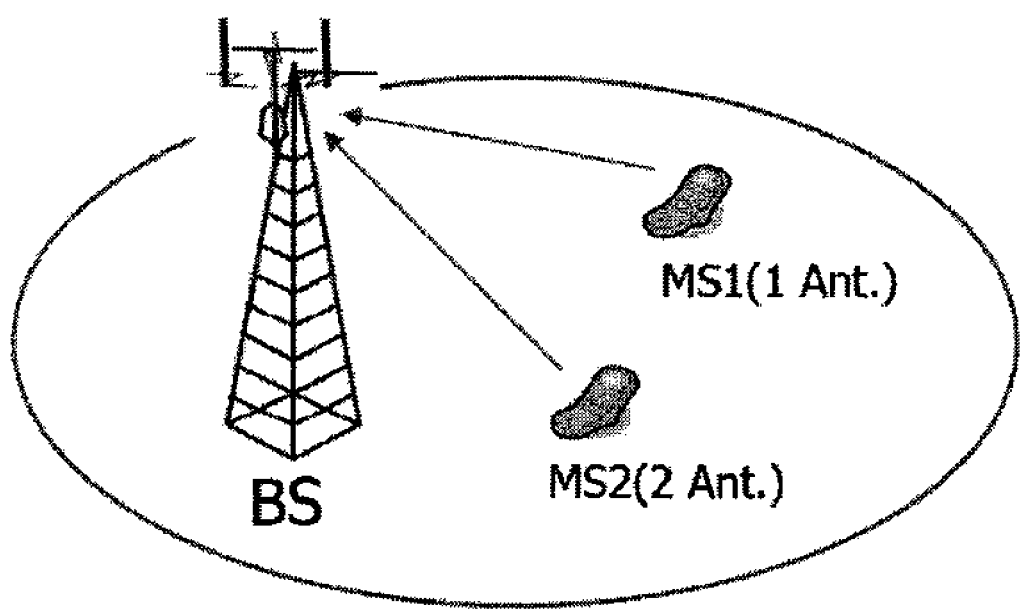
FIG. 1 shows an exemplary uplink transmission under the IEEE 802.16-2004 standard or the IEEE 802.16e network standard.
Figure 9:
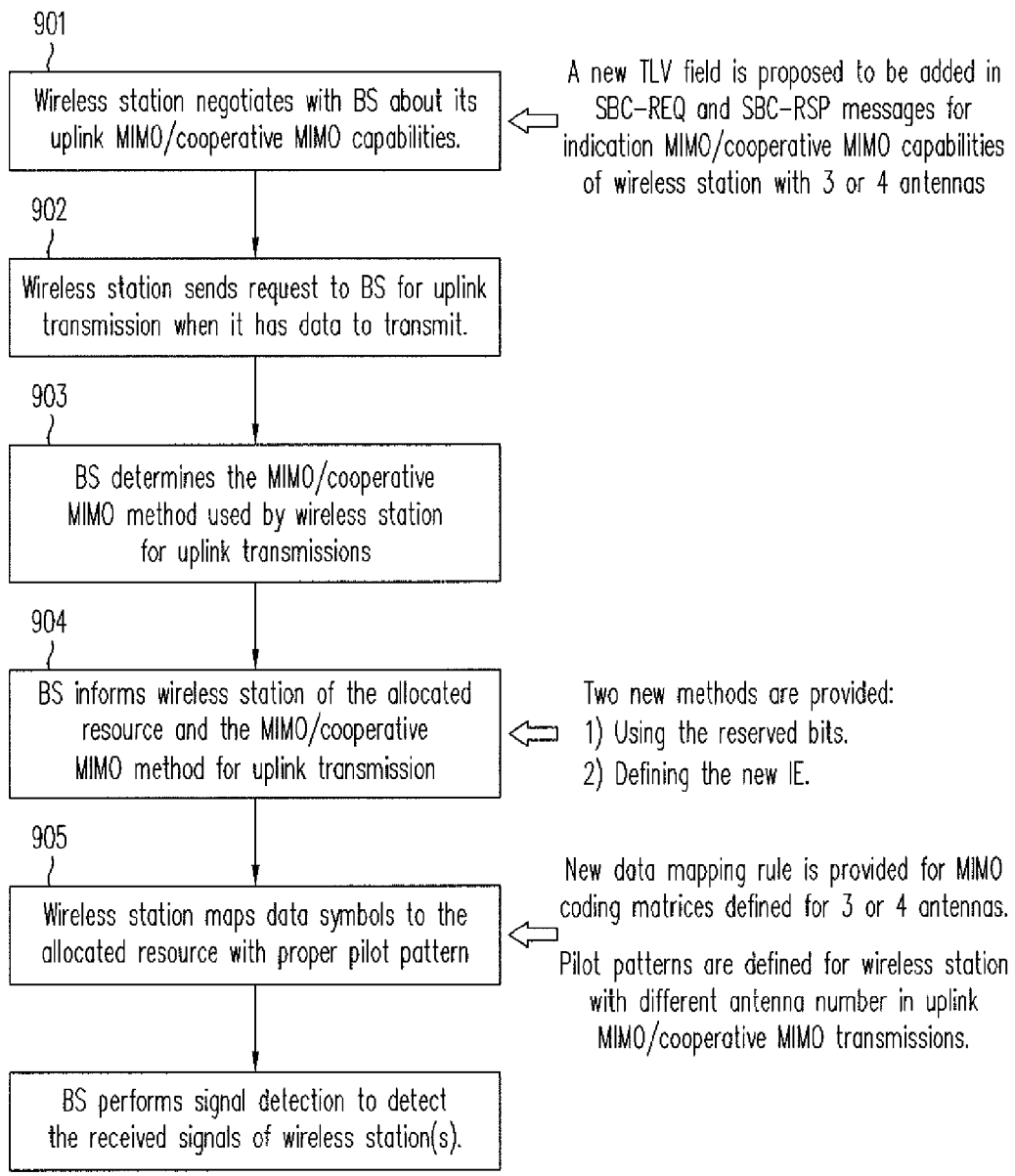
FIG. 9 illustrates a procedure for uplink MIMO/cooperative MIMO transmissions, in accordance with one embodiment of the present invention.

FIG. 9 illustrates a procedure for uplink MIMO/cooperative MIMO transmissions, in accordance with one embodiment of the present invention. As shown in FIG. 9, at step 901, a WS having three or four antennae negotiates with a BS for uplink MIMO/cooperative MIMO capabilities, using SBC-REQ and SBC-RSP messages, similar to those defined for the IEEE 802.16-2004 and the IEEE 802.16e standards, but including the TLV field shown in FIG. 10. FIG. 10 shows a TLV field defined for SBC-REQ and SBC-RSP messages which specifies the MIMO/cooperative MIMO capabilities for a WS having three or four antennae. As shown in FIG. 10, the TLV field specifies MIMO/cooperative MIMO capabilities including (a) STFC matrices for vertical coding and horizontal coding, (b) antennas selection, (c) antenna grouping, (d) preceding; and (e) MIMO/cooperative capabilities. In this embodiment, a set bit (i.e., bit value '1') indicates that the corresponding capability is supported, while a reset bit (i.e., bit value '0') indicates that the corresponding capability is not supported. In FIG. 10, bit #11 is set by the WS to inform the BS that the WS can support an uplink codebook-based pre-coding.

The prior art does not have MIMO matrices for uplink MIMO/cooperative MIMO transmissions defined for a WS with three or four antennas. Therefore, new MIMO coding matrices may be developed. Alternatively, the MIMO coding matrices defined for downlink transmissions under the IEEE 802.16e standard may be used. In one embodiment of the present invention, MIMO coding matrices defined for downlink transmissions under the IEEE 802.16e standard are used. For example, for SM, the MIMO coding matrices for a WS with three or four antennae are:

$$c = \begin{bmatrix} s_1 \\ s_2 \\ s_3 \end{bmatrix} \quad C = \begin{bmatrix} s_1 \\ s_2 \\ s_3 \\ s_4 \end{bmatrix}$$

For SFTC, the MIMO coding matrices for a WS with three antennas are:

$$A_1 = \begin{bmatrix} \tilde{s}_1 & -\tilde{s}_2^* & 0 & 0 \\ \tilde{s}_2 & \tilde{s}_1^* & \tilde{s}_3 & \tilde{s}_4^* \\ 0 & 0 & \tilde{s}_4 & \tilde{s}_3^* \end{bmatrix}$$

$$A_2 = \begin{bmatrix} \tilde{s}_1 & -\tilde{s}_2^* & \tilde{s}_3 & -\tilde{s}_4^* \\ \tilde{s}_2 & \tilde{s}_1^* & 0 & 0 \\ 0 & 0 & \tilde{s}_4 & \tilde{s}_3^* \end{bmatrix}$$

$$A_3 = \begin{bmatrix} \tilde{S}_1 & -\tilde{S}_2^* & 0 & 0 \\ 0 & 0 & \tilde{S}_3 & -\tilde{S}_4^* \\ \tilde{S}_2 & \tilde{S}_1^* & \tilde{S}_4 & \tilde{S}_3^* \end{bmatrix}$$

$$B_1 = \begin{bmatrix} \tilde{S}_7 & -\tilde{S}_8^* & \tilde{S}_3 & -\tilde{S}_4^* \\ \tilde{S}_1 & -\tilde{S}_2^* & \tilde{S}_5 & -\tilde{S}_6^* \\ \tilde{S}_2 & \tilde{S}_1^* & \tilde{S}_6 & \tilde{S}_5^* \end{bmatrix}$$

$$B_2 = \begin{bmatrix} \tilde{S}_1 & -\tilde{S}_2^* & \tilde{S}_5 & -\tilde{S}_6^* \\ \tilde{S}_7 & -\tilde{S}_8^* & \tilde{S}_3 & -\tilde{S}_4^* \\ \tilde{S}_2 & \tilde{S}_1^* & \tilde{S}_6 & \tilde{S}_5^* \end{bmatrix}$$

$$B_3 = \begin{bmatrix} \tilde{S}_1 & -\tilde{S}_2^* & \tilde{S}_5 & -\tilde{S}_6^* \\ \tilde{S}_2 & \tilde{S}_1^* & \tilde{S}_6 & \tilde{S}_5^* \\ \tilde{S}_7 & -\tilde{S}_8^* & \tilde{S}_3 & -\tilde{S}_4^* \end{bmatrix}$$

For SFTC, the MIMO coding matrices for a WS with four antennae are:

$$A_1 = \begin{bmatrix} S_1 & -S_2^* & 0 & 0 \\ S_2 & S_1^* & 0 & 0 \\ 0 & 0 & S_3 & -S_4^* \\ 0 & 0 & S_4 & S_3^* \end{bmatrix},$$

$$A_2 = \begin{bmatrix} S_1 & -S_2^* & 0 & 0 \\ 0 & 0 & S_3 & -S_4^* \\ S_2 & S_1^* & 0 & 0 \\ 0 & 0 & S_4 & S_3^* \end{bmatrix},$$

$$A_3 = \begin{bmatrix} S_1 & -S_2^* & 0 & 0 \\ 0 & 0 & S_3 & -S_4^* \\ 0 & 0 & S_4 & S_3^* \\ S_2 & S_1^* & 0 & 0 \end{bmatrix}.$$

$$B_1 = \begin{bmatrix} S_1 & -S_2^* & S_5 & -S_7^* \\ S_2 & S_1^* & S_6 & -S_8^* \\ S_3 & -S_4^* & S_7 & S_5^* \\ S_4 & S_3^* & S_8 & S_6^* \end{bmatrix},$$

$$B_2 = \begin{bmatrix} S_1 & -S_2^* & S_5 & -S_7^* \\ S_2 & S_1^* & S_6 & -S_8^* \\ S_4 & S_3^* & S_8 & S_6^* \\ S_3 & -S_4^* & S_7 & S_5^* \end{bmatrix},$$

$$B_3 = \begin{bmatrix} S_1 & -S_2^* & S_5 & -S_7^* \\ S_3 & -S_4^* & S_7 & S_5^* \\ S_2 & S_1^* & S_6 & -S_8^* \\ S_4 & S_3^* & S_8 & S_6^* \end{bmatrix}.$$

$$B_4 = \begin{bmatrix} S_1 & -S_2^* & S_5 & -S_7^* \\ S_4 & S_3^* & S_8 & S_6^* \\ S_2 & S_1^* & S_6 & -S_8^* \\ S_3 & -S_4^* & S_7 & S_5^* \end{bmatrix},$$

$$B_5 = \begin{bmatrix} S_1 & -S_2^* & S_5 & -S_7^* \\ S_3 & -S_4^* & S_7 & S_5^* \\ S_4 & S_3^* & S_8 & S_6^* \\ S_2 & S_1^* & S_6 & -S_8^* \end{bmatrix},$$

$$B_6 = \begin{bmatrix} S_1 & -S_2^* & S_5 & -S_7^* \\ S_4 & S_3^* & S_8 & S_6^* \\ S_3 & -S_4^* & S_7 & S_5^* \\ S_2 & S_1^* & S_6 & -S_8^* \end{bmatrix}.$$

In precoding, the MIMO coding matrices for a WS with two antennas are:

| Vector index | 1 | 2 | 3 | 4 | 5 | 6 | 7 | 8 |
|---|---|---|---|---|---|---|---|---|
| v1 | 1 | 0.7940 | 0.7940 | 0.7941 | 0.7941 | 0.3289 | 0.5112 | 0.3289 |
| v2 | 0 | −0.5801 + j0.1818 | 0.0576 + j0.6051 | −0.2978 − j0.5298 | 0.6038 + j0.0689 | 0.6614 + j0.6740 | 0.4754 − j0.7160 | −0.8779 − j0.3481 |

| Matrix index (binary) | Column1 | Column2 | Matrix index (binary) | Column1 | Column2 |
|---|---|---|---|---|---|
| 000 | 1 | 0 | 100 | 0.7941 | 0.6038 − j0.0689 |
|  | 0 | 1 |  | 0.6038 + j0.0689 | −0.7941 |
| 001 | 0.7940 | −0.5801 − j0.1818 | 101 | 0.3289 | 0.6614 − j0.6740 |
|  | −0.5801 + j0.1818 | −0.7940 |  | 0.6614 + j0.6740 | −0.3289 |
| 010 | 0.7940 | 0.0576 − j0.6051 | 110 | 0.5112 | 0.4754 + j0.7160 |
|  | 0.0576 + j0.6051 | −0.7940 |  | 0.4754 − j0.7160 | −0.5112 |
| 011 | 0.7941 | −0.2978 + j0.5298 | 111 | 0.3289 | −0.8779 + j0.3481 |
|  | −0.2978 − j0.5298 | −0.7941 |  | −0.8779 − j0.3481 | −0.3289 |

In precoding, the MIMO coding matrices for a WS with three antennae are:

| Vector index | 1 | 2 | 3 | 4 | 5 | 6 | 7 | 8 |
|---|---|---|---|---|---|---|---|---|
| v1 | 1 | 0.500 | 0.500 | 0.500 | 0.500 | 0.4954 | 0.500 | 0.500 |
| v2 | 0 | −0.7201 − j0.3126 | −0.0659 + j0.1371 | −0.0063 + j0.6527 | 0.7171 + j0.3202 | 0.4819 − j0.4517 | 0.0686 − j0.1386 | −0.0054 − j0.6540 |
| v3 | 0 | 0.2483 − j0.2684 | −0.6283 − j0.5763 | 0.4621 − j0.3321 | −0.2533 + j0.2626 | 0.2963 − j0.4801 | 0.6200 + j0.5845 | −0.4566 + j0.3374 |

| Matrix index (binary) | Column1 | Matrix index (binary) | Column1 |
|---|---|---|---|
| 000000 | 0.5774<br>−0.2887 + j0.5000<br>−0.2887 − j0.5000 | 100000 | 0.5437<br>−0.1363 − j0.4648<br>0.4162 + j0.5446 |
| 000001 | 0.5466<br>0.2895 − j0.5522<br>0.2440 + j0.5030 | 100001 | 0.5579<br>−0.6391 + j0.3224<br>−0.2285 − j0.3523 |
| 000010 | 0.5246<br>−0.7973 − j0.0214<br>−0.2517 − j0.1590 | 100010 | 0.5649<br>0.6592 − j0.3268<br>0.1231 + j0.3526 |
| 000011 | 0.5973<br>0.7734 + j0.0785<br>0.1208 + j0.1559 | 100011 | 0.484<br>−0.6914 − j0.3911<br>−0.3669 + j0.0096 |
| 000100 | 0.4462<br>−0.3483 − j0.6123<br>−0.5457 + j0.0829 | 100100 | 0.6348<br>0.5910 + j0.4415<br>0.2296 − j0.0034 |
| 000101 | 0.6662<br>0.2182 + j0.5942<br>0.3876 − j0.0721 | 100101 | 0.4209<br>0.0760 − j0.5484<br>−0.7180 − j0.0283 |
| 000110 | 0.412<br>0.3538 − j0.2134<br>−0.8046 − j0.1101 | 100110 | 0.6833<br>−0.1769 + j0.4784<br>0.5208 − j0.0412 |
| 000111 | 0.684<br>−0.4292 + j0.1401<br>0.5698 + j0.0605 | 100111 | 0.4149<br>0.3501 + j0.2162<br>−0.7772 − j0.2335 |
| 001000 | 0.4201<br>0.1033 + j0.5446<br>−0.6685 − j0.2632 | 101000 | 0.6726<br>−0.4225 − j0.2866<br>0.5061 + j0.1754 |
| 001001 | 0.6591<br>−0.1405 − j0.6096<br>0.3470 + j0.2319 | 101001 | 0.419<br>−0.2524 + j0.6679<br>−0.5320 − j0.1779 |
| 001010 | 0.407<br>−0.5776 + j0.5744<br>−0.4133 + j0.0006 | 101010 | 0.6547<br>0.2890 − j0.6562<br>0.1615 + j0.1765 |
| 001011 | 0.6659<br>0.6320 − j0.3939<br>0.0417 + j0.0157 | 101011 | 0.3843<br>−0.7637 + j0.3120<br>−0.3465 + j0.2272 |
| 001100 | 0.355<br>−0.7412 − j0.0290<br>−0.3542 + j0.4454 | 101100 | 0.69<br>0.6998 + j0.0252<br>0.0406 − j0.1786 |
| 001101 | 0.7173<br>0.4710 + j0.3756<br>0.1394 − j0.3211 | 101101 | 0.3263<br>−0.4920 − j0.3199<br>−0.4413 + j0.5954 |
| 001110 | 0.307<br>−0.0852 − j0.4143<br>−0.5749 + j0.6295 | 101110 | 0.7365<br>0.0693 + j0.4971<br>0.2728 − j0.3623 |
| 001111 | 0.74<br>−0.3257 + j0.3461<br>0.3689 − j0.3007 | 101111 | 0.3038<br>0.3052 − j0.2326<br>−0.6770 + j0.5496 |
| 010000 | 0.3169<br>0.4970 + j0.1434<br>−0.6723 + j0.4243 | 110000 | 0.727<br>−0.5479 − j0.0130<br>0.3750 − j0.1748 |
| 010001 | 0.7031<br>−0.4939 − j0.4297<br>0.2729 − j0.0509 | 110001 | 0.3401<br>0.4380 + j0.5298<br>−0.5470 + j0.3356 |
| 010010 | 0.3649<br>0.1983 + j0.7795<br>−0.3404 + j0.3224 | 110010 | 0.6791<br>−0.1741 − j0.7073<br>0.0909 − j0.0028 |
| 010011 | 0.6658<br>0.2561 − j0.6902<br>−0.0958 − j0.0746 | 110011 | 0.3844<br>−0.1123 − j0.8251<br>−0.1082 + j0.3836 |
| 010100 | 0.3942<br>−0.3862 + j0.6614<br>0.0940 + j0.4992 | 110100 | 0.6683<br>0.5567 − j0.3796<br>−0.2017 − j0.242 |

-continued

| | | | |
|---|---|---|---|
| 010101 | 0.6825<br>0.5632 + j0.0490<br>−0.1901 − j0.4225 | 110101 | 0.394<br>−0.5255 + j0.3339<br>0.2176 + j0.6401 |
| 010110 | 0.3873<br>−0.4531 − j0.0567<br>0.2298 + j0.7672 | 110110 | 0.6976<br>0.2872 + j0.3740<br>−0.0927 − j0.5314 |
| 010111 | 0.7029<br>−0.1291 + j0.4563<br>0.0228 − j0.5296 | 110111 | 0.3819<br>−0.1507 − j0.3542<br>0.1342 + j0.8294 |
| 011000 | 0.387<br>0.2812 − j0.3980<br>−0.0077 + j0.7828 | 111000 | 0.6922<br>−0.5051 + j0.2745<br>0.0904 − j0.4269 |
| 011001 | 0.6658<br>−0.6858 − j0.0919<br>0.0666 − j0.2711 | 111001 | 0.4083<br>0.6327 − j0.1488<br>−0.0942 + j0.6341 |
| 011010 | 0.4436<br>0.7305 + j0.2507<br>−0.0580 + j0.4511 | 111010 | 0.6306<br>−0.5866 − j0.4869<br>−0.0583 − j0.1337 |
| 011011 | 0.5972<br>−0.2385 − j0.7188<br>−0.2493 − j0.0873 | 111011 | 0.4841<br>0.5572 + j0.5926<br>0.0898 + j0.3096 |
| 011100 | 0.5198<br>0.2157 + j0.7332<br>0.2877 + j0.2509 | 111100 | 0.5761<br>0.1868 − j0.6492<br>−0.4292 − j0.1659 |
| 011101 | 0.571<br>0.4513 − j0.3043<br>−0.5190 − j0.3292 | 111101 | 0.5431<br>−0.1479 + j0.6238<br>0.4646 + j0.2796 |
| 011110 | 0.5517<br>−0.3892 + j0.3011<br>0.5611 + j0.3724 | 111110 | 0.5764<br>0.4156 + j0.1263<br>−0.4947 − j0.4840 |
| 011111 | 0.5818<br>0.1190 + j0.4328<br>−0.3964 − j0.5504 | 111111 | 0.549<br>−0.3963 − j0.1208<br>0.5426 + j0.4822 |

In preceding, the MIMO coding matrices for a WS with four antennae are

| Vector index | 1 | 2 | 3 | 4 | 5 | 6 | 7 | 8 |
|---|---|---|---|---|---|---|---|---|
| v1 | 1 | 0.3780 | 0.3780 | 0.3780 | 0.3780 | 0.3780 | 0.3780 | 0.3780 |
| v2 | 0 | −0.2698 − j0.5668 | −0.7103 + j0.1326 | 0.2830 − j0.0940 | −0.0841 + j0.6478 | 0.5247 + j0.3532 | 0.2058 − j0.1369 | 0.0618 − j0.3332 |
| v3 | 0 | 0.5957 + j0.1578 | −0.2350 − j0.1467 | 0.0702 − j0.8261 | 0.0184 + j0.0490 | 0.4115 + j0.1825 | −0.5211 + j0.0833 | −0.3456 + j0.5029 |
| v4 | 0 | 0.1587 − j0.2411 | 0.1371 + j0.4893 | −0.2801 + j0.0491 | −0.3272 − j0.5662 | 0.2639 + j0.4299 | 0.6136 − j0.3755 | −0.5704 + j0.2113 |

| Matrix index (binary) | Column1 | Column2 | Column3 |
|---|---|---|---|
| 000 | 0<br>1<br>0<br>0 | 0<br>0<br>1<br>0 | 0<br>0<br>0<br>1 |
| 001 | −0.2698 + j0.5668<br>0.3665<br>0.4022 − j0.4743<br>−0.1509 − j0.2492 | 0.5957 − j0.1578<br>0.4022 + j0.4743<br>0.3894<br>−0.0908 + j0.2712 | 0.1587 + j0.2411<br>−0.1509 + j0.2492<br>−0.0908 − j0.2712<br>0.8660 |
| 010 | −0.7103 − j0.1326<br>0.1606<br>−0.2371 − j0.2176<br>0.0522 + j0.5880 | −0.2350 + j0.1467<br>−0.2371 + j0.2176<br>0.8766<br>0.1672 + j0.1525 | 0.1371 − j0.4893<br>0.0522 − j0.5880<br>0.1672 − j0.1525<br>0.5848 |
| 011 | 0.2830 + j0.0940<br>0.8570<br>−0.1568 + j0.3653<br>0.1349 + j0.0200 | 0.0702 + j0.8261<br>−0.1568 − j0.3653<br>−0.1050<br>0.0968 + j0.3665 | −0.2801 − j0.0491<br>0.1349 − j0.0200<br>0.0968 − j0.3665<br>0.8700 |
| 100 | −0.0841 − j0.6478<br>0.3140<br>−0.0485 + j0.0258<br>0.5454 − j0.4174 | 0.0184 − j0.0490<br>−0.0485 − j0.0258<br>0.9956<br>0.0543 − j0.0090 | −0.3272 + j0.5662<br>0.5454 + j0.4174<br>0.0543 + j0.0090<br>0.3125 |
| 101 | 0.5247 − j0.3532<br>0.3569<br>−0.4508 + j0.0797<br>−0.4667 − j0.2128 | 0.4115 − j0.1825<br>−0.4508 − j0.0797<br>0.6742<br>−0.3007 − j0.2070 | 0.2639 − j0.4299<br>−0.4667 + j0.2128<br>−0.3007 + j0.2070<br>0.5910 |

-continued

| Matrix index (binary) | Column1 | Column2 | Column3 | Column4 |
| --- | --- | --- | --- | --- |
| 110 | 0.2058 + j0.1369 | −0.5211 − j0.0833 | 0.6136 + j0.3755 | |
| | 0.9018 | 0.1908 − j0.0871 | −0.2857 + j0.0108 | |
| | 0.1908 + j0.0871 | 0.5522 | 0.5644 + j0.2324 | |
| | −0.2857 − j0.0108 | 0.5644 − j0.2324 | 0.1680 | |
| 111 | 0.0618 + j0.3332 | −0.3456 − j0.5029 | −0.5704 − j0.2113 | |
| | 0.8154 | 0.3037 − j0.1352 | 0.1698 − j0.2845 | |
| | 0.3037 + j0.1352 | 0.4015 | −0.4877 + j0.3437 | |
| | 0.1698 + j0.2845 | −0.4877 − j0.3437 | 0.4052 | |

| Matrix index (binary) | Column1 | Column2 | Column3 | Column4 |
| --- | --- | --- | --- | --- |
| 000 | 1 | 0 | 0 | 0 |
| | 0 | 1 | 0 | 0 |
| | 0 | 0 | 1 | 0 |
| | 0 | 0 | 0 | 1 |
| 001 | 0.3780 | −0.2698 + j0.5668 | 0.5957 − j0.1578 | 0.1587 + j0.2411 |
| | −0.2698 − j0.5668 | 0.3665 | 0.4022 + j0.4743 | −0.1509 + j0.2492 |
| | 0.5957 + j0.1578 | 0.4022 − j0.4743 | 0.3894 | −0.0908 − j0.2712 |
| | 0.1587 − j0.2411 | −0.1509 − j0.2492 | −0.0908 + j0.2712 | 0.8660 |
| 010 | 0.3780 | −0.7103 − j0.1326 | −0.2350 + j0.1467 | 0.1371 − j0.4893 |
| | −0.7103 + j0.1326 | 0.1606 | −0.2371 + j0.2176 | 0.0522 − j0.5880 |
| | −0.2350 − j0.1467 | −0.2371 − j0.2176 | 0.8766 | 0.1672 − j0.1525 |
| | 0.1371 + j0.4893 | 0.0522 + j0.5880 | 0.1672 + j0.1525 | 0.5848 |
| 011 | 0.3780 | 0.2830 + j0.0940 | 0.0702 + j0.8261 | −0.2801 − j0.0491 |
| | 0.2830 − j0.0940 | 0.8570 | −0.1568 − j0.3653 | 0.1349 − j0.0200 |
| | 0.0702 − j0.8261 | −0.1568 + j0.3653 | −0.1050 | 0.0968 − j0.3665 |
| | −0.2801 + j0.0491 | 0.1349 + j0.0200 | 0.0968 + j0.3665 | 0.8700 |
| 100 | 0.3780 | −0.0841 − j0.6478 | 0.0184 − j0.0490 | −0.3272 + j0.5662 |
| | −0.0841 + j0.6478 | 0.3140 | −0.0485 − j0.0258 | 0.5454 + j0.4174 |
| | 0.0184 + j0.0490 | −0.0485 + j0.0258 | 0.9956 | 0.0543 + j0.0090 |
| | −0.3272 − j0.5662 | 0.5454 − j0.4174 | 0.0543 − j0.0090 | 0.3125 |
| 101 | 0.3780 | 0.5247 − j0.3532 | 0.4115 − j0.1825 | 0.2639 − j0.4299 |
| | 0.5247 + j0.3532 | 0.3569 | −0.4508 − j0.0797 | −0.4667 + j0.2128 |
| | 0.4115 + j0.1825 | −0.4508 + j0.0797 | 0.6742 | −0.3007 + j0.2070 |
| | 0.2639 + j0.4299 | −0.4667 − j0.2128 | −0.3007 − j0.2070 | 0.5910 |
| 110 | 0.3780 | 0.2058 + j0.1369 | −0.5211 − j0.0833 | 0.6136 + j0.3755 |
| | 0.2058 − j0.1369 | 0.9018 | 0.1908 − j0.0871 | −0.2857 + j0.0108 |
| | −0.5211 + j0.0833 | 0.1908 + j0.0871 | 0.5522 | 0.5644 + j0.2324 |
| | 0.6136 − j0.3755 | −0.2857 − j0.0108 | 0.5644 − j0.2324 | 0.1680 |
| 111 | 0.3780 | 0.0618 + j0.3332 | −0.3456 − j0.5029 | −0.5704 − j0.2113 |
| | 0.0618 − j0.3332 | 0.8154 | 0.3037 − j0.1352 | 0.1698 − j0.2845 |
| | −0.3456 + j0.5029 | 0.3037 + j0.1352 | 0.4015 | −0.4877 + j0.3437 |
| | −0.5704 + j0.2113 | 0.1698 + j0.2845 | −0.4877 − j0.3437 | 0.4052 |

At step 902, the WS sends a request to the BS for uplink transmission when the WS has data to be transmitted. At step 903, the BS determines the uplink MIMO/cooperative MIMO method (e.g., stream number, STFC matrix, antenna grouping method, and precoding matrix) to be used by the WS, according to the BS's measurement of its channel, the bandwidth requests of the wireless stations, and other parameters.

Then, at step 904, the BS may use either one of two methods to inform the WS with more than two antennae of the allocated resource and the MIMO/cooperative MIMO method for uplink transmissions. The first method uses reserved bits in the MIMO_UL_Enhanced_IE message to specify that: 1) the message addresses a WS with more than two antennae; and 2) an uplink MIMO/cooperative MIMO method using MIMO coding matrices defined for three or four antennas. FIG. 11 shows one implementation of a MIMO_UL_Enhanced_IE, according to one embodiment of the present invention. As shown in FIG. 11, a Matrix_Indicator_RS field is defined relevant to a WS having three or four antennae. Together with the Matrix_Indicator field and the Pilot Pattern Indicator field, the Matrix_Indicator_RS field specifies the MIMO coding matrix mapping tables for a WS with three or four antennae. FIGS. 12 and 13 show respectively exemplary MIMO coding matrix mapping tables for WS's with three antennae and four antennae.

For example, if the Matrix_Indicator field is set to 0, the Pilot Pattern Indicator field is set to 1 and the Matrix_Indicator_RS field is set to 10, a WS with three antennae refers to the MIMO coding matrix mapping table of FIG. 12 to determine that STFC matrix C for uplink MIMO transmissions is specified. Similarly, for these same bit values, a WS with four antennae refers to the MIMO coding matrix mapping table of FIG. 13 to determine that STFC matrix B4 for uplink MIMO transmissions is specified. Since each WS is identified by a different Connection Identifier (CID), the BS can select the proper MIMO coding matrix mapping table for the WS. As shown in FIG. 12, for example, the specification "Cn" denotes also antenna selection. "C1-one stream" denotes that only the first antenna is used, "C2-one stream" denotes that only the second antenna is used, "C3-one stream" denotes that only the third antenna is used, "C1-two streams" denotes that both the second and the third antennae are used, "C2-two streams" denotes that both the first and the third antennas are used, and "C3-two streams" denotes that both the first and the second antennae are used.

The advantages of using the reserved bits of the TLV field include compatibility and low overhead. Under this scheme, uplink MIMO/cooperative MIMO transmission methods are extended to a WS with three or four antennae without requiring modification by existing WS's. Also, no additional overhead is introduced in the communication protocol. However, because the number of reserved bits in the TLV is limited, the number of supported MIMO/cooperative MIMO methods using this scheme is necessary limited (i.e., not all MIMO/ cooperative MIMO methods can be supported under this scheme). For example, the exemplary coding matrix mapping tables of FIGS. 12 and 13 do not support precoding.

Alternatively, the BS may use a second method which uses a new MIMO uplink IE for a WS having more than two antennae. FIG. 14 shows one exemplary MIMO uplink IE ("MIMO_UL_Extended_IE"), according to one embodiment of the present invention. As shown in FIG. 14, a WS is first categorized according to the number of antennae to be used in the transmission, even if the actual number of antennae in the WS is greater. Thus, the antenna selection overhead is merged with the spatial multiplexing matrix, when a small number of antennae are used, resulting in a reduced total overhead. FIG. 15 illustrates an example of overhead reduction in merging the MIMO coding matrix of antenna selection for a 4-antenna WS, and the MIMO coding matrix of spatial multiplexing of a 3-antenna WS. In the example of FIG. 15, by setting the 4-bit Antenna_Indicator field in the uplink MIMO IE of FIG. 14 to 0b1101 (for a 4-antenna WS) or 0b1110 (for a 3-antenna WS), the antenna selection and the spatial multiplexing matrices can share one index.

The MIMO_UL_Extended_IE of FIG. 14 supports uplink MIMO/cooperative MIMO transmission for WS's with three or four antennae, provides high flexibility and can supports a large number of MIMO coding schemes, including STFC, antenna selection and grouping, and precoding. FIG. 16 summarizes the supported uplink MIMO/cooperative MIMO methods in the MIMO_UL_Extended_IE of FIG. 14. As shown in FIG. 16, the notation "C(m, n)" denotes two WS's, using m and n antennae, respectively, are involved in the uplink cooperative MIMO transmission. Similarly, the notation "C(m, n, p, q)" denotes four WS's, having m, n, p and q antennae, respectively, involved in an uplink cooperative MIMO transmission. FIG. 17 shows a cooperative MIMO transmission example that may be supported by the MIMO_UL_Extended_IE in an IEEE 802.16j network. In this example, in which WS 1 (i.e., RS1) and WS 2(i.e., RS 2) have four transmission antennae, the channel for WS 1 is line-of-sight (LOS), but can only support one data stream, and the channel for WS 2 is non-line-of-sight (NLOS), but can possible support one, two or three streams. In this instance, the BS first measures the channel for WS 2 to obtain the number of streams that may be supported by the channel. The BS can then specify for WS 1 and WS 2 cooperative MIMO transmissions using any of the C(1,1), C(1,2) and C(1,3) configurations. Such channel-aware cooperative MIMO transmissions improves greatly uplink spectrum efficiency.

Using the MIMO_UL_Extended_IE message provides high flexibility and allows a large number of MIMO/cooperative MIMO methods to be supported, including SM, STFC, precoding, and antenna selection and antenna grouping. This method also provides good compatibility, as uplink MIMO/cooperative MIMO methods for WS's with three or four antennae are supported without requiring modification by existing WS's. Compare to using reserved bits in the TVL field, the present method has a larger overhead.

At step 905, new data mapping rule for MIMO coding matrices are defined for three or four antennae. Furthermore, pilot patterns are defined for used in uplink MIMO/cooperative MIMO transmissions by WS's with different number of antennae. For antenna selection and cooperative MIMO transmissions, the WS first checks the Antenna_Indicator field in the MIMO_UL_Extended_IE to acquire the specified number of antennae to be used. Then, for a WS using one antenna, one of the pilot patterns (i.e. any of pilot patterns A, B, C or D) may be used. The BS determines the pilot pattern to be used by the WS and specifies that pilot pattern in the IE.

For a WS using 2 antennae, there are two choices. Either antenna 1 uses pilot pattern A and antenna 2 uses pilot pattern B, or antenna 1 uses pilot pattern C and antenna 2 uses pilot pattern D. Again, the BS determines the pilot pattern to be used by the WS and indicates the pilot pattern in the IE. For a WS using three antennae, the first antenna may use pilot pattern A, the second antenna may use pilot pattern B, and the third antenna may use pilot pattern C. For a WS using four antennae, the first antenna may use pilot pattern A, the second antenna may use pilot pattern B, the third antenna may use pilot pattern C and the fourth antenna may use pilot pattern D.

Relative to the existing standards, pilot pattern assignment for cooperative MIMO transmissions under the present invention is flexible. For example, under the IEEE 802.16e standard, cooperative MIMO transmission of four 1-antenna WS's is not supported because each 1-antenna WS can only use only pilot pattern A or pilot pattern B. The pilot pattern assignment under the present invention is not restricted in this regard. FIG. 18 shows a cooperative MIMO transmission example, according to one embodiment of the present invention. In an IEEE 802.16j network, a fixed WS (e.g., RS) may have an LOS channel. For such a channel, pilot pattern assignment under IEEE 802.16e restricts the uplink spectrum efficiency. However, under the pilot pattern assign rule discussed above, cooperative MIMO transmissions are enabled, and thus uplink spectrum efficiency is significantly improved.

As discussed above, a data mapping rule map coded data symbols to a tile. In the MIMO coding matrices for three or four antennae, the coded data symbols occupy four subcarriers for both 3-antenna MIMO coding matrices and 4-antenna MIMO coding matrices. As up to eight MIMO coded data symbols may be contained in the tile, mapping rules can be developed such that the coded data symbols in the tile may be divided into two groups of data symbols, with each group corresponding to the data symbols output from a MIMO coding matrix. FIG. 19 shows one example of a data mapping rule governing two MIMO coding matrices, in accordance with one embodiment of the present invention. As shown in FIG. 19, the output symbols of a first MIMO coding matrix are mapped to subcarriers 1, 3, 7, 5 and the output symbols of a second MIMO coding matrix are mapped to subcarriers 2, 4, 8, 6.

Using the method illustrated in FIG. 19, a total of $$\binom{4}{8} = \frac{8!}{4!(8-4)!} = 70$$

mapping rules are possible. The exemplary mapping rule of FIG. 19 has at least two advantages. First, the MIMO coded symbols are distributed evenly, so that spatial-time-frequency diversity gain can be maximized in a fast-changing channel, in terms of both time domain and frequency domain performance. Second, since the output symbols of the two MIMO coding matrices have the same mapping pattern, each MIMO coding matrix would have similar performance characteristics. Thus, balance performance of the two MIMO coding matrices may be achieved.

The above detailed description is provided to illustrate the specific embodiments of the present invention and is not intended to be limiting. Numerous variations and modifications within the scope of the present invention are possible. The present invention is set forth in the following claims.

We claim:
1. A method for MIMO uplink communications by a wireless station having more than two antennae, comprising:

negotiating with a base station for uplink MIMO/cooperative MIMO capabilities between the wireless station and the base station, using a message exchange protocol, wherein a message exchanged comprises a field for specifying uplink MIMO/cooperative MIMO capabilities;

sending a request for data transmission to the base station;

receiving from the base station an allocated resource and an uplink MIMO/cooperative MIMO method for uplink transmission; and mapping data symbols to the allocated resource with proper pilot pattern, wherein mapping data symbols maps output coded data from more than one MIMO coding matrix to a tile, wherein mapping data symbols maps output coded data from more than one MIMO coding matrix to a tile, wherein the subcarriers of symbols in the tile are divided into two non-overlapping groups, and wherein the MIMO coding matrices are each associated with a different one of the two non-overlapping groups.

2. The method of claim 1, wherein the capabilities are selected from the group consisting of spatial multiplexing, space-time-frequency coding, precoding, transmit antenna selection and transmit antenna grouping, vertical coding and horizontal coding.

3. The method of claim 1, wherein uplink precoding vectors and matrices are provided for wireless stations with two or more antennas.

4. The method of claim 1, wherein the uplink MIMO/cooperative MIMO method comprises matrices selected from the group consisting of STFC matrices, SM matrices, and precoding vectors or matrices.

5. The method of claim 1, wherein the allocated resource and the uplink MIMO/cooperative MIMO method are specified in the reserved bits in MIMO_UL_Enhanced_IE under an IEEE wireless network standard.

6. The method of claim 5, wherein the reserved bits address a wireless station having more than two antennae.

7. The method of claim 5, wherein the uplink MIMO/cooperative MIMO method involves matrices for an application selected from the group consisting of precoding, antenna grouping and antenna selection.

8. The method of claim 1, wherein the allocated resource and the uplink MIMO/cooperative MIMO capabilities are specified in a MIMO uplink information element for wireless station with more than two antennae.

9. The method of claim 8, wherein the wireless station is first categorized according to the number of antennae to be used in the uplink transmission.

10. The method of claim 1, wherein the base station defines a pilot pattern to be used by the wireless station.

11. The method of claim 1, wherein mapping data symbols comprises mapping data symbols to subcarriers of OFDMA symbols.

12. A method for MIMO uplink communications between a base station and a wireless station, comprising:

negotiating with the wireless station uplink MIMO/cooperative MIMO capabilities, using a message exchange protocol, wherein a message exchanged comprises a field for specifying uplink MIMO/cooperative MIMO capabilities;

receiving a request for data transmission from the wireless station;

sending the wireless station an allocated resource and an uplink MIMO/cooperative MIMO method for uplink transmission; and detecting from the channel data symbols mapped to the allocated resource with proper pilot pattern, wherein more than one MIMO coding matrix map data symbols to a tile, and wherein the subcarriers of symbols in the tile are divided into two non-overlapping groups, and wherein the MIMO coding matrices are each associated with a different one of the two non-overlapping groups.

13. The method of claim 12, wherein the capabilities are selected from the group consisting of spatial multiplexing, space-time-frequency coding, precoding, transmit antenna selection and transmit antenna grouping, vertical coding and horizontal coding.

14. The method of claim 12, wherein uplink precoding vectors and matrices are provided for wireless stations with two or more antennas.

15. The method of claim 12, wherein the uplink MIMO/cooperative MIMO method comprises matrices selected from the group consisting of STFC matrices, SM matrices, and precoding vectors or matrices.

16. The method of claim 12, wherein the allocated resource and the uplink MIMO/cooperative MIMO method are specified in the reserved bits in MIMO_UL_Enhanced_IE under an IEEE wireless network standard.

17. The method of claim 16, wherein the reserved bits address a wireless station having more than two antennae.

18. The method of claim 17, wherein the uplink MIMO/cooperative MIMO method involves matrices for an application selected from the group consisting of precoding, antenna grouping and antenna selection.

19. The method of claim 12, wherein the allocated resource and the uplink MIMO/cooperative MIMO capabilities are specified in a MIMO uplink information element for wireless station with more than two antennae, and wherein the wireless station is first categorized according to the number of antennae to be used in the uplink transmission.

20. The method of claim 12, wherein the base station defines a pilot pattern to be used by the wireless station.

21. The method of claim 12, wherein the data symbols are mapped to subcarriers of OFDMA symbols.

* * * * *

UNITED STATES PATENT AND TRADEMARK OFFICE
CERTIFICATE OF CORRECTION

PATENT NO. : 7,965,785 B2  
APPLICATION NO. : 11/930600  
DATED : June 21, 2011  
INVENTOR(S) : Anxin Li et al.

It is certified that error appears in the above-identified patent and that said Letters Patent is hereby corrected as shown below:

In claim 1, column 17, line 12 delete "wherein mapping data symbols"  
In claim 1, column 17, line 13 delete "maps output coded data from more then one MIMO"  
In claim 1, column 17, line 14 delete "coding matrix to a tile"

Signed and Sealed this  
Thirty-first Day of January, 2012

David J. Kappos  
*Director of the United States Patent and Trademark Office*